(12) United States Patent
Arnold et al.

(10) Patent No.: US 8,354,778 B2
(45) Date of Patent: Jan. 15, 2013

(54) DUAL-MODE PIEZOELECTRIC/MAGNETIC VIBRATIONAL ENERGY HARVESTER

(75) Inventors: David Patrick Arnold, Gainesville, FL (US); Toshikazu Nishida, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 446 days.

(21) Appl. No.: 12/672,792

(22) PCT Filed: Sep. 18, 2008

(86) PCT No.: PCT/US2008/076879
§ 371 (c)(1),
(2), (4) Date: Feb. 9, 2010

(87) PCT Pub. No.: WO2009/039293
PCT Pub. Date: Mar. 26, 2009

(65) Prior Publication Data
US 2011/0215590 A1    Sep. 8, 2011

Related U.S. Application Data

(60) Provisional application No. 60/973,339, filed on Sep. 18, 2007.

(51) Int. Cl.
*H01L 41/08* (2006.01)
*H01L 41/113* (2006.01)
*H02N 2/18* (2006.01)
(52) U.S. Cl. ........................ 310/370
(58) Field of Classification Search .................. 310/339
See application file for complete search history.

(56) References Cited

U.S. PATENT DOCUMENTS

| 5,801,475 | A * | 9/1998 | Kimura | 310/319 |
| 6,252,336 | B1 * | 6/2001 | Hall | 310/339 |
| 6,954,025 | B2 | 10/2005 | Nishida et al. | |
| 6,984,902 | B1 | 1/2006 | Huang et al. | |
| 6,995,496 | B1 * | 2/2006 | Hagood et al. | 310/317 |

(Continued)

FOREIGN PATENT DOCUMENTS

JP    05-322926    12/1993
(Continued)

OTHER PUBLICATIONS

Becker, P., et al., "The Hybrid Vibration Generator, A New Approach for a High Efficiency Energy Scavenger," *PowerMEMS 2009*, Washington, DC, USA, Dec. 1-4, 2009, pp. 439-442.

(Continued)

*Primary Examiner* — J. San Martin
(74) *Attorney, Agent, or Firm* — Saliwanchik, Lloyd & Eisenschenk

(57) ABSTRACT

Embodiments of a vibrational energy harvester are provided. A vibrational energy harvester can include a translator layer sandwiched between two stator layers. The translator layer can include a plate having an array of magnets and two or more piezoelectric patches coupled to a tether beam attached to the plate. The stator layers can have a printed circuit board with multilayer electrical windings situated in a housing. In operation, vibration of the housing can result in bending of the piezoelectric patches coupled to the tether beam. This bending simultaneously results in a relative displacement of the translator, which causes a voltage potential in the piezoelectric patches, and a relative velocity between the translator and the stators, which induces a voltage potential in the stator coils. These voltage potentials generate an AC power, which can be converted to DC power through a rectification circuit incorporating passive and active conversion.

35 Claims, 4 Drawing Sheets

U.S. PATENT DOCUMENTS

| | | | |
|---|---|---|---|
| 7,105,982 | B1 | 9/2006 | Hagood, IV et al. |
| 7,132,757 | B2 | 11/2006 | Steigerwald et al. |
| 7,170,201 | B2 | 1/2007 | Hamel et al. |
| 7,173,343 | B2 | 2/2007 | Kugel |
| 7,471,033 | B2 * | 12/2008 | Thiesen et al. .............. 310/339 |
| 7,579,757 | B2 * | 8/2009 | Kulah et al. .................. 310/339 |
| 7,626,316 | B2 * | 12/2009 | Kozinsky et al. ............ 310/339 |
| 7,800,278 | B2 * | 9/2010 | Ujihara et al. ................ 310/306 |
| 7,999,402 | B2 * | 8/2011 | Freeland et al. ............. 290/1 R |
| 2001/0003788 | A1 | 6/2001 | Ball et al. |
| 2004/0007942 | A1 | 1/2004 | Nishida et al. |
| 2005/0134149 | A1 | 6/2005 | Deng et al. |
| 2005/0205125 | A1 | 9/2005 | Nersessian et al. |
| 2006/0006484 | A1 | 1/2006 | Seneviratne et al. |
| 2006/0175937 | A1 | 8/2006 | Clingman et al. |
| 2006/0176158 | A1 | 8/2006 | Fleming |
| 2006/0237968 | A1 | 10/2006 | Chandrasekaran |
| 2008/0277941 | A1 * | 11/2008 | Bowles et al. ................. 290/54 |
| 2010/0033142 | A1 * | 2/2010 | Roberts et al. ................ 322/40 |
| 2012/0267982 | A1 * | 10/2012 | Carman et al. ............... 310/318 |

FOREIGN PATENT DOCUMENTS

| | | |
|---|---|---|
| JP | 10-339639 | 12/1998 |
| WO | WO-02-03856 A2 | 1/2002 |
| WO | WO-2006-046937 A1 | 5/2006 |
| WO | WO-2006-046989 A1 | 5/2006 |

OTHER PUBLICATIONS

Beeby, S.P., et al., "Micromachined Silicon Generator for Harvesting Power from Vibrations," *Proceedings of the 4th International Workshop on Micro and Nanotechnology for Power Generation and Energy Conversion Applications*, 2004, pp. 104-107, Kyoto, Japan.

James, E.P., et al., "An Investigation of Self-Powered Systems for Condition Monitoring Applications," *Sensors and Actuators A: Physical*, Feb. 2004, pp. 171-176, vol. 10, No. 1-3.

Kasyap, A., "Development of MEMS-based Piesoelectric Cantilever Arrays for Vibrational Energy Harvesting," PhD dissertation, University of Florida, Gainesville, FL, Dec. 2006.

Koeneman, et al., "Feasibility of Micro Power Supplies for MEMS," *Journal of Microelectromechanical Systems*, Dec. 1997, pp. 355-362, vol. 6, No. 4.

Leland, E.S., et al., "Energy Scavenging Power Sources for Household Electrical Monitoring," 2006, University of California-Berkeley: Department of Mechanical Engineering.

Leland, E.S., et al., "Resonance Tuning of Piezoelectric Vibration Energy Scavenging Generators Using Compressive Axial Preload," *Smart Materials and Structures*, Oct. 2006, pp. 1413-1420, vol. 15, No. 5.

McDougall, K., et al., "Prototype Design for an Energy Harvesting Device," Dec. 2005, Stevens Institute of Technology.

Roundy, S., et al., "A 1.9GHz RF Transmit Beacon Using Environmentally Scavenged Energy," 2004, University of California-Berkeley: Department of Electrical Engineering and Computer Sciences; Mechanical Engineering Department.

Roundy, S., et al., "A Study of Low Level Vibrations as a Power Source for Wireless Sensor Nodes," *Computer Communications*, pp. 1131-1144, vol. 26.

Roundy, S., et al., "Improving Power Output for Vibration-Based Energy Scavengers," *Pervasive Computing*, Jan. 2005, pp. 28-36, vol. 4, No. 1.

Saez, M.L.M., "Energy Harvesting from Passive Human Power," Jan. 2004, Villanova University: Electronic Engineering Department.

Sato, N., et al., "Characteristics of Thermoelectric and Vibrational Devices for Integrated MEMS Power Generator," *Proceedings of the 5th International Workshop on Micro and Nanotechnology for Power Generation and Energy Conversion Applications (Power MEMS 2005)*, Tokyo, Japan, Nov. 2005, pp. 5-8.

Sodano, H.A., et al., "Generation and Storage of Electricity from Power Harvesting Devices," *Journal of Intelligent Material Systems and Structures*, Jan. 2005, pp. 67-75, vol. 16, No. 1.

Srikar, V.T., et al., "Thermoelastic Damping in Fine Grained Polysilicon Flexural Beam Resonators," *Journal of Microelectromechanical Systems*, Oct. 2002, pp. 499-504, vol. 11, No. 5.

Starner, T., "Human Powered Wearable Computing," *IBM Systems Journal*, 1996, pp. 618-629, vol. 35, Nos. 3-4.

Stephen, N.G., "On Energy Harvesting from Ambient Vibration," *Journal of Sound and Vibration*, May 2006, pp. 409-425, vol. 293, Nos. 1-2.

Thomas, J.P., et al., "Energy Scavenging for Small-Scale Unmanned Systems," *Journal of Power Sources*, Sep. 2006, pp. 1494-1509, vol. 159, No. 2.

Wischke, M., et al., "A Hybrid Generator for Vibration Energy Harvesting Applications," *Transducers 2009*, Denver, CO, USA, Jun. 21-25, 2009, pp. 521-524.

Wischke, M., et al., "A Multi-Functional Cantilever for Energy Scavenging from Vibrations," *Proceedings of PowerMEMS 2008 + microEMS 2008*, Sendai, Japan, Nov. 9-12 (2008), pp. 73-76.

Wolchok, J., et al., "Vibrational Energy Scavenging: An Interdisciplinary Engineering Design Project," *Proceedings of the 2005 American Society for Engineering Education Conference & Exposition*, Jun. 2005.

\* cited by examiner

DUAL-MODE PIEZOELECTRIC/MAGNETIC VIBRATIONAL ENERGY HARVESTER

CROSS-REFERENCE TO RELATED APPLICATIONS

The present application is the U.S. National Stage Application of International Patent Application No. PCT/US2008/076879, filed on Sep. 18, 2008 which claims the benefit of U.S. Provisional Application Ser. No. 60/973,339, filed Sep. 18, 2007, both of which are hereby incorporated by reference herein in their entirety, including any figures, tables, or drawings.

BACKGROUND OF INVENTION

Cellular phones, media players, and other high-performance portable electronics are becoming increasingly ubiquitous for business and personal use. Battery technologies have afforded major conveniences for a wide array of portable electronic products. Additionally, battery-powered power tools and home appliances are becoming more commonplace. These systems typically rely on high power density, secondary (rechargeable) batteries such as lithium-ion, nickel-metal-hydride, or nickel-cadmium. In contrast, low-power electronic devices, such as remote controls, medical devices, pagers, watches, and toys, typically use primary (single-use) alkaline manganese, mercuric oxide, silver oxide, or lithium batteries because of their lower energy demands. For modern portable electronic devices, the use of secondary (rechargeable) batteries charged by grid-supplied battery rechargers is energy-inefficient, while the use of primary (single-use) batteries yields disproportionate amounts of hazardous waste.

With improvements in wireless communications and emerging technologies such as wearable electronics, the expansion of portable electronics in modern society shows no sign of slowing. Thus, a careful examination of the energy and environmental impact of these devices is warranted. Poor energy efficiency of batteries, especially for rechargeables, can have detrimental environmental impacts and product safety issues. For example, while the power consumption of an individual device may be relatively small, the total power required to repeatedly recharge hundreds of millions of these devices is not. Currently in the U.S., for example, the total number of cellular phones in use today requires a continuous average power of nearly 300 megawatts, the equivalent of a mid-size power plant. Only 5% of this energy is actually used to power the phone, while the remaining 95% is wasted by inefficiencies in the charging of rechargeable batteries.

In addition, the batteries required to power these portable devices often contain potentially hazardous chemicals, such as mercury, lead, manganese, lithium, and cadmium. These chemicals can contaminate the environment when not properly disposed. Moreover, many of the batteries are prone to overheating, fire, and even explosion. Despite increased efforts for recycling programs, most batteries end up in landfills. It is estimated that only 3-5% of dry-cell batteries are recycled each year [Rechargeable Battery Recycling Corporation Rechargeable Battery Recycling Corporation Website: http://www.rbrc.org/call2recycle/].

The total grid-supplied energy consumption and environmental impact of portable electronic devices can be significantly reduced by developing energy harvesting technologies as an alternative, "green", power solution. Moreover, completely "unplugging" portable/wireless devices from the hassle of wall-outlet based battery recharging offers the opportunity for enhanced functionality. There exists a number of potential energy harvesting technologies, such as solar, thermoelectric, and vibrational technologies. For personal electronics carried in a pocket, briefcase, or purse where light or temperature gradients are not readily available, vibrational energy harvesters have been of great interest to enable self-powered sensors, wearable computers, and other battery-less electronics [e.g. T. Starner "Human powered wearable computing," *IBM Syst. J.*, vol. 35, nos. 3/4, pp. 618-629, 1996; R. B. Koeneman, I. J. Busch-Vishniac, and K. L. Wood, "Feasibility of micro power supplies for MEMS," *J. Microelectomech. Syst.*, vol. 6, no. 4, pp. 355-362, December 1997; S. Roundy, P. K. Wright, and J. Rabaey, "A study of low level vibrations as a power source for wireless sensor nodes," *Computer Communications*, vol. 26, pp. 1131-1144, 2003], especially for applications where physical motion is readily available.

Unfortunately, vibrational energy harvesting devices have not found widespread success, largely because of limited performance and poorly targeted applications. In particular, the utility of many previously developed energy harvesters has been limited because the devices have been designed without regard to a particular application, often leading to good perfoimance on a laboratory bench, but no "real-world" application. Regarding performance of the vibrational energy devices, many of the energy harvesters have been constructed using micromachining or micro-electromechanical systems (MEMS) fabrication technologies (intended for ultra-miniaturized self-powered sensor applications). However, with reduced size scale, it has been quite challenging to achieve a mechanical resonance low enough to match the frequency range for naturally occurring vibrations (~1 Hz-1 kHz). In addition, many previously reported systems are fairly high-Q resonant devices designed for maximum performance at only one narrowly defined frequency. This can limit their usefulness because naturally occurring vibrations usually have wide spectral content, and the primary vibration frequencies change in time. There has been some interest in investigating multi-source (e.g., vibrational, theiinal, and/or solar) energy harvesters [e.g., N. Sato, H. Ishii, K. Kuwabara, T. Sakata, J. Terada, H. Morimura, K. Kudou, T. Kamei, M. Yano, and K. Machida, "Characteristics of thermoelectric and vibrational devices for integrated MEMS power generator," in *Proc. 5th Int. Workshop on Micro and Nanotechnology for Power Generation and Energy Conversion Apps. (PowerMEMS 2005)*, Tokyo, Japan, November 2005, pp. 5-8.].

Accordingly, there is still a need for a multi-transduction method and device for harvesting vibrational energy in an efficient manner with high power density. Such a method and device can reduce the energy demand and environmental impact of portable electronic devices, while simultaneously enhancing the utility for the end user.

BRIEF SUMMARY

Embodiments of the subject invention relate to a method and apparatus for vibrational energy harvesting. Specific embodiments can provide power to portable electronic devices. Embodiments of the subject invention relate to compact, hybrid power systems that use multi-mode vibrational energy-harvesting. Specific embodiments can be used to power portable electronic devices, such as a cellular telephone handset. Embodiments improve the overall electrical efficiency of the device power system and reduce the hazardous waste associated with powering the portable electronic device. Embodiments of the present invention implement vibrational energy-harvesting techniques to create compact, hybrid power systems that reduce or eliminate the dependence of grid-supplied electricity while simultaneously reducing the hazardous waste associated with battery disposal. Embodiments of the subject energy harvesting device merge two types of vibrational energy harvesters, namely piezoelectric and electromagnetic, into a single, multi-mode energy converter.

In an embodiment, the hybrid power system contains a vibrational energy harvester, power conversion electronics, and an energy storage device such as a battery, capacitor, or supercapacitor.

In an embodiment, a dual-mode magnetic/piezoelectric energy scheme is provided that may afford a combined energy density of 7 mW/cm$^3$ in a low-profile form factor that is commensurate with modern portable electronic devices. This power density can achieve the 70 mW target in the space of a typical cell phone battery of 10 cm$^3$ (3.5 cm×5.5 cm×0.5 cm).

Embodiments of the subject invention can enable the charging of wireless portable electronics without the persistent hassle of battery charging. In an embodiment, a mesoscale (centimeter sized) energy harvester is provided, intended for use in the vibrational environment of cellular handset (0.1 g at ~2 Hz).

In an embodiment, lumped-element, multi-degree-of-freedom electromechanical transducer models can be used to enable design optimization to achieve broadband frequency response.

In an embodiment, a vibrational energy harvester is provided that can include a cantilever beam; a piezoelectric patch coupled to the cantilever beam; a permanent magnet coupled to one end of the cantilever beam and providing mass; and a coil affixed near the permanent magnet, where the piezoelectric patch provides piezoelectric transduction and the permanent magnet and the coil provide magnetic transduction.

In an embodiment, a vibrational energy harvester is provided that can include a translator layer having a plate having an array of magnets, and one or more composite piezoelectric beams coupled to a tether beam attached to the plate; a first stator layer including first stator coils formed spaced apart at one side of the translator layer; and a second stator layer including second stator coils formed spaced apart at a second side of the translator layer. In a specific embodiment, bending of the composite piezoelectric beams coupled to the tether beam results in the strain induced in the piezoelectric material generating a voltage. In addition, the bending of the tether beam attached to an array of magnets causes a relative velocity between the translator magnet assembly and the stators that induces a voltage potential in the stator coils.

BRIEF DESCRIPTION OF DRAWINGS

FIG. 4A shows a top view of the translator layer, and FIG. 4B shows a side view of the entire structure.

DETAILED DISCLOSURE

Embodiments of the present invention pertain to compact power sources for sensors, portable electronics, and battery-operated devices. Embodiments provide a dual-mode magnetic/piezoelectric energy harvesting structure. In an embodiment, an integrated structure is provided that may achieve a high power density. In addition, system level enhancements involving complementary voltage/current levels and impedances may be incorporated.

Embodiments of the present invention provide an energy harvesting structure that uses both piezoelectric and magnetic transduction schemes simultaneously. A specific embodiment of a vibrational energy harvester in accordance with the subject invention incorporates a body and a proof mass connected to the body via a flexible member. The proof mass moves with respect to the body via bending of the flexible member when the body is moved. A piezoelectric patch is attached to the flexible member such that the piezoelectric patch creates a voltage when the flexible member bends. The harvester also includes at least one magnet and at least one coil positioned with respect to the harvester such that the at least one magnet and at least one coil move with respect to each other when the proof mass moves with respect to the body so as to create a voltage in the at least one coil.

Figure 1:
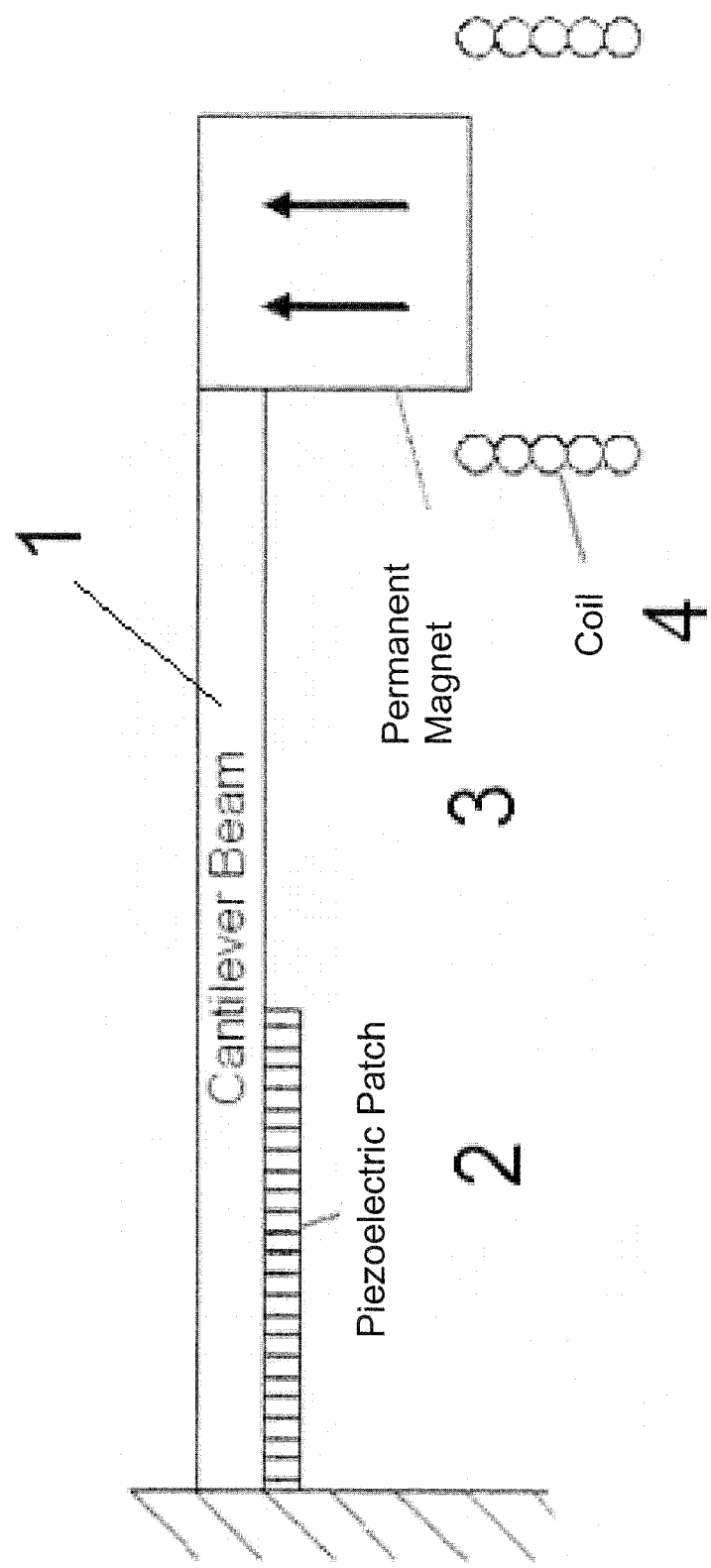
FIG. 1 shows a dual-mode piezoelectric/electromagnetic energy harvester according to an embodiment of the present invention.

Referring to FIG. 1, a basic mass-spring-damper structure according to an embodiment of the present invention is shown having a cantilever beam 1 having a piezoelectric patch 2 and permanent magnet 3 that serves as a proof mass. A fixed electrical coil 4 is also positioned beneath the magnet. Under external vibration, the cantilever will bend, causing voltage generation in the strained piezoelectric layer. Additionally, the time-varying motion between the moving permanent magnet 3 and the fixed coil 4 results in power generation in the coil. Other structures can be implemented in accordance with the subject invention, such as locating the coil 4 at the end of the cantilever beam 1 and positioning the permanent magnet 3 beneath the coil. In addition, other relative positions of coils and permanent magnets are allowed.

This structure can offer higher net power density compared to either a standard piezo or magnetic harvester because of the dual use of the mechanical components. Moreover, additional advantages may be offered by this dual use transduction schemes.

Magnetic harvesters typically have relatively low voltages (<1 Vpk) and low output impedances. In contrast, piezoelectric harvesters usually operate with very high voltages (1-100 Vpk) but have high output impedance. Note that maximum power transfer occurs when the load impedance equals (technically the complex conjugate) the output impedance. Thus, for a magnetic generator connected to a matched low-impedance load, relatively high currents will flow and large amounts of energy can be extracted from the generator. For a piezoelectric generator connected to a matched high-impedance load, not as much current flows, but because of the high voltages significant amounts of energy can be extracted.

Referring again to FIG. 1, a high-performance magnet 3 can be incorporated with the vibrational energy harvester. In a specific embodiment, the harvester is about one inch long. The magnet can be made of, for example, either NdFeB or SmCo. An electrical coil 4 can be affixed beneath the magnet such that as the magnet vibrates up and down a current is generated in the coil 4. In a specific embodiment, the cantilever beam 1 is attached to the body of the harvester and the coil 4 is attached to the harvester, such that when the cantilever bends the magnet moves with respect to the coil. In an alternative embodiment, the coil 4 is positioned on the cantilever while the magnet is attached to the body of the harvester, such that when the cantilever bends the coil moves with respect to the magnet. In addition, piezoelectric energy conversion can be included in the supporting cantilever beam 1 by incorporating one or more piezoelectric patches 2. This architecture represents a coupled electromechanical system with two transduction paths: strain and electromagnetic. Embodiments can utilize a variety of structures to support the piezoelectric patches, such as, but not limited to, membranes or other flexible members.

A lumped element model is useful for analyzing and designing coupled energy domain transducer systems [M. Rossi, *Acoustics and Electroacoustics*. Norwood, Mass.: Artec House Inc, 1988]. In this approach, circuit elements are used to represent the coupled electromechanical behavior of the device. Each circuit element is derived by "lumping" the distributed energy stored or dissipated by the element. The circuit elements are then connected together such that they share/exchange energy as governed by the physics of the actual system. These circuit analogies enable efficient modeling of multi-energy-domain systems, whereby all the tools developed for circuit analysis (e.g., general circuit modeling, phasor analysis, frequency response techniques, and even circuit simulation software such as PSPICE) can be utilized for representing and solving a coupled system with different energy domains.

Figure 2:
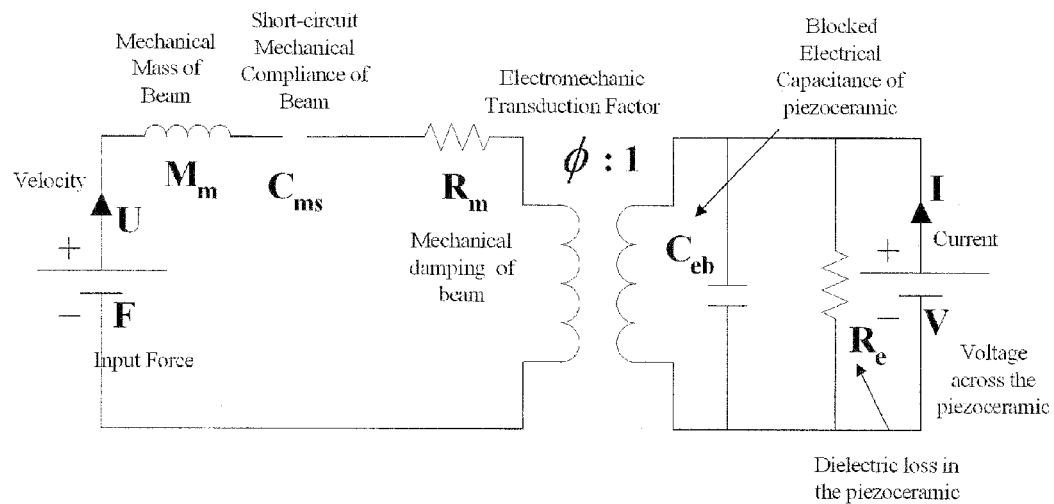
FIG. 2 shows an equivalent lumped element model for a piezoelectric vibrational energy harvester according to an embodiment of the present invention.

A piezoelectric vibrational energy harvester is an electromechanical system that can be separated into two energy domains, having electrical and mechanical parts. In the equivalent circuit, these two energy domains interact via a transformer as shown in FIG. 2. In this electromechanical circuit, force and voltage are the generalized effort variables, while velocity and current are the generalized flow variables [S. D. Senturia, *Microsystem Design*. Boston: Kluwer, 2000]. An impedance analogy is used to represent the circuit, in which case all elements that share a common effort are connected in parallel, and the elements that share a common flow are connected in series. When the composite beam is subject to a mechanical force, the strain induced in the piezoelectric material generates a voltage, which represents the conversion from the mechanical to the electrical domain.

FIG. 2 represents the entire equivalent circuit having mechanical and electrical lumped elements represented in the physical system. All elements are labeled and defined in FIG. 2. The first subscript denotes the domain (m for mechanical and e for electric), while the second subscript denotes the condition (s for short circuit and b for blocked). Using the described notation, for example, $C_{ms}$ is defined as short-circuit mechanical compliance, and $C_{ab}$ is the blocked electrical capacitance of the piezoceramic. F is the effective force applied to the structure that is obtained by the product of input acceleration and effective mass lumped at the tip, U is the relative tip velocity with respect to the base, V is the voltage, and I is the current generated at the ends of the piezoceramic. All the parameters are obtained by lumping the energy at the tip using the relative motion of the tip with respect to the clamp/base.

The beam is represented as a spring-mass-damper system by lumping the energy (kinetic and potential) in the beam to an equivalent mass and compliance. The mechanical mass and compliance of the structure can be equated to an equivalent electrical inductance and capacitance. Similarly, mechanical damping is analogous to electrical resistance. Mechanical damping coefficients include effects such as viscous dissipation, boundary condition non-ideality, and thermoelastic dissipation [V. T. Srikar and S. D. Senturia, "Thermoelastic damping in fine grained polysilicon flexural beam resonators," *J. Microelectromech. Syst.*, vol. 11, pp. 499-504, October 2002]. While damping is a critical parameter for resonant behavior modeling, the damping coefficients cannot often be estimated from first principles. Instead, experimental test structures are often used, and the parameters are fed back into the device model.

In addition to the mechanical damping, there is damping caused by the electromechanical interactions. In principle, the fundamental operation of any power generator is dependent on the nature of the mechanism by which the energy is extracted. In other words, the electrical circuit directly impacts the mechanical response of the device. This is where the ability to model the coupled physics using lumped element modeling becomes advantageous.

The model shown in FIG. 2 represents an already-developed electromechanical model for the piezoelectric generator [A. Kasyap, "Development of MEMS-based piezoelectric cantilever arrays for vibrational energy harvesting," PhD dissertation, University of Florida, Gainesville, Fla., December 2006.]. Embodiments of the invention can utilize a model that includes the piezoelectric transduction and the electromagnetic transduction. This second electromechanical effect can be included by the addition of another energy coupling circuit element. For electrodynamic interactions, a gyrator is used instead of a transformer to represent the coupling [S. D. Senturia, *Microsystem Design*. Boston: Kluwer, 2000.], and the model implementation is fairly straightforward.

One advancement offered by a dual-mode magnetic/piezoelectric energy harvesting technique according to an embodiment of the present invention is the synergy between the two types of transduction schemes. Embodiments include a power electronics design that effectively combines the magnetic and piezoelectric energy harvesters to achieve a higher total power density and improved system implementation.

Several characteristic differences between the electromagnetic and piezoelectric transduction schemes are summarized in Table 1.

TABLE 1

Comparison of electromagnetic and piezoelectric energy devices

|  | Electromagnetic | Piezoelectric |
|---|---|---|
| Voltage | Low | High |
| Current | High | Low |
| Output impedance | Low (resistive) | High (capacitive) |

In a specific embodiment, the two generators, piezoelectric and magnetic, operate at the same frequency, and power is extracted from each of the generators and then combined together.

For harmonic vibrations, the output power for both energy harvester types is an AC waveform and can be rectified to DC. The DC current can be used to, for example, power an electronic device and/or charge a battery. From a system-level standpoint, this rectification circuit should preferably consume little or no power and occupy a small volume. In larger power systems, these power consumption and size requirements are easy to meet, however, this is not the case for miniaturized power systems.

For example, passive AC-DC converters are desired since they do not require an external power source. However, for magnetic harvesters, the output voltage is often too small to overcome the forward-bias diode drop for a passive diode rectifying circuit. A transformer, which is also passive, can be used to boost the voltage, but the transformer can be significantly larger than the energy harvester. In an embodiment, compact, active switching power electronics can be incorporated for the rectification of the magnetic harvester output voltage.

Figure 3:
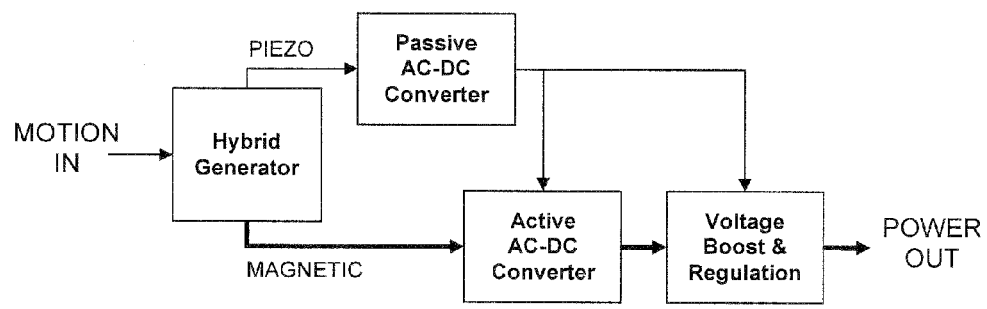
FIG. 3 shows a block diagram of a hybrid energy harvester power system electronic design according to an embodiment of the present invention.

A specific embodiment of the multi-transduction method and device powers the electromagnetic active converter with power outputted from the piezoelectric vibrational energy harvester. FIG. 3 shows a block diagram of an embodiment of a hybrid energy harvester power electronic design. Primary power flow is indicated by the heavy arrows and supplemental power is indicated by the lighter arrows. Referring to FIG. 3, a simple diode-bridge passive rectifier can be used such that the voltage generated by the piezoelectric device can be used to power an active switched-mode MOSFET AC-DC converter. A boost converter can also be used to increase and regulate the load voltage to 3-5 V DC in order to charge the battery [S. Das, "Magnetic machines and power electronics for power MEMS applications," Ph.D. Dissertation, MIT, Cambridge, Mass., September 2005]. This configuration offers a highly compact, efficient solution that can utilize the magnetic and piezoelectric generators. In specific embodiments, the piezoelectric patch can provide timing information, such as phase and/or amplitude information, to the circuit for outputting power from the one or more coils.

Specific embodiments of the subject hybrid energy harvester power system can fit the slim, rectangular form factor of a typical cellular phone battery. In an embodiment, the energy harvesting device can occupy a fraction of the 10 cm$^3$ (e.g. 3.5 cm×5.5 cm×0.5 cm) volume of a modern cellular phone battery.

Figure 4A:
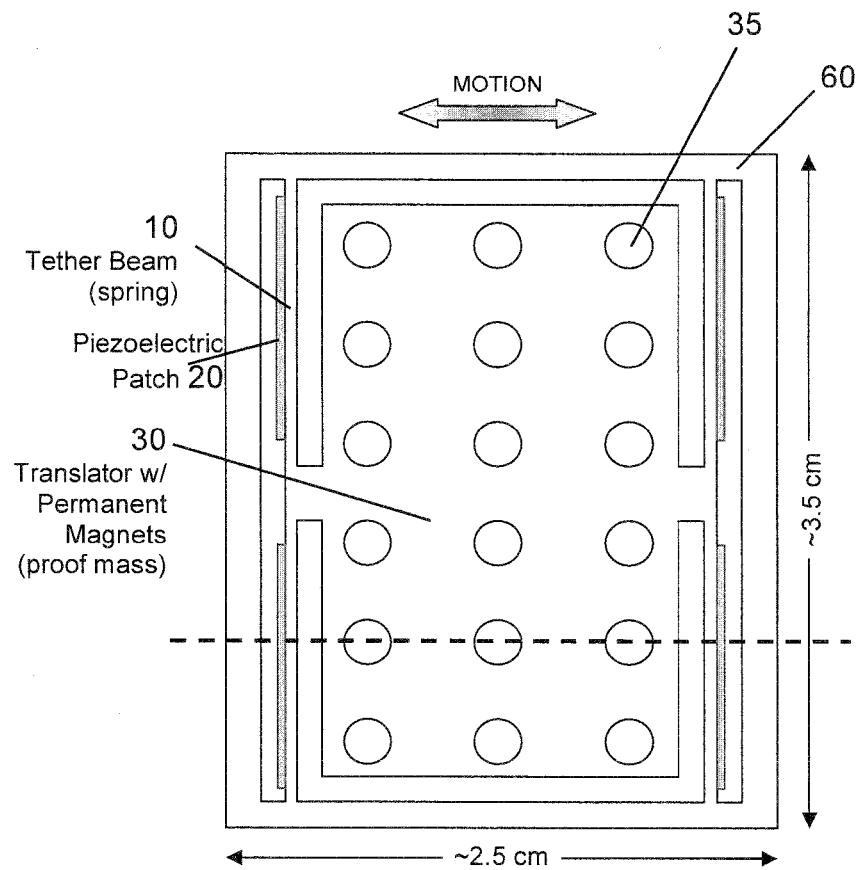
FIGS. 4A and 4B show drawings of an embodiment of a dual-mode vibrational energy harvester, where
Figure 4B:
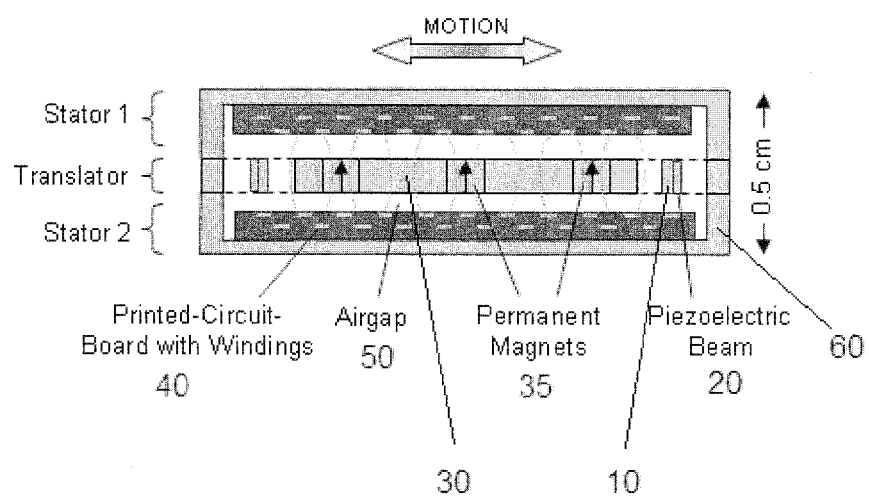

An embodiment of an energy harvester structure is shown in FIGS. 4A and 4B. The energy harvester structure can include one "translator" layer and two "stator" layers. The translator layer can be a mass-spring-damper system having a plate 30 with an array of magnets 35, which forms the mechanical proof mass, and two or more composite piezoelectric beams 20 attached to a tether beam 10, which form mechanical springs. The mass can be suitably large and the springs sufficiently compliant to ensure a low resonant frequency to match the low vibration frequencies (~2 Hz) targeted for human motion. Alternative embodiments can ensure other resonant frequencies, such as 60-300 Hz to match machinery vibration frequencies or other frequencies the device might be exposed to. Damping arises from mechanical/fluidic losses as well as electromechanical interactions. The two stators can each incorporate a housing 60 and a printed-circuit-board with multilayer electrical windings 40. The complete device can be formed by sandwiching the translator between the two stators with an airgap 50 therebetween.

Other structures can be implemented in accordance with the invention, such as positioning the magnets on one or more stator layers and positioning the coils on the translator layer. Other arrangements of magnets and coils can also be implemented, such as embodiments where the magnets and coils travel toward and away from each other, as in FIG. 1. Additional arrangements of the magnets and coils are also possible.

In operation, the device can function in a manner similar to the device described with respect to FIG. 1. In particular, vibration of the housing 60 can result in bending of the beams 10 and, hence, relative displacement of the translator 30 with respect to the housing. The bending of the composite beams 10 causes a voltage potential in the piezoelectric patches 20. At the same time, the relative motion between the translator and stators induces a voltage potential in the stator coils via Faraday's law of magnetic induction.

In an embodiment, conventional machining of aluminum or steel can be used to form the translator and the stator housings. Commercially available polyvinylidene fluoride (PVDF) piezoelectric patches with integrated electrodes can be affixed to the sidewalls of the tether beams. Lead zirconate titanate (PZT) can be used instead of PVDF, but there may be some environmental toxicity issues associated with the lead content of PZT. Commercially available NdFeB magnets can be affixed into pre-drilled holes in the translator proof mass. The printed-circuit-boards can be designed using conventional circuit-board CAD software (e.g., Protel). A precise magnetic airgap between the translator and stators can be accomplished by careful design of the tether beams for high transverse stiffness. The electrical interconnections, such as wiring, inside the device and to external connections can use modern chip-packaging technologies, such as flex-circuits and 3D wire-welding, taking into account the final design configuration.

Additional embodiments can allow power generation for vibrations in two or more axes of motion. Embodiments can use multi-degree-of-freedom translators designed to permit the device to respond in two or even three axes of motion. These structures can be batch-fabricated at relatively low cost using various micromachining approaches.

Figure 5:
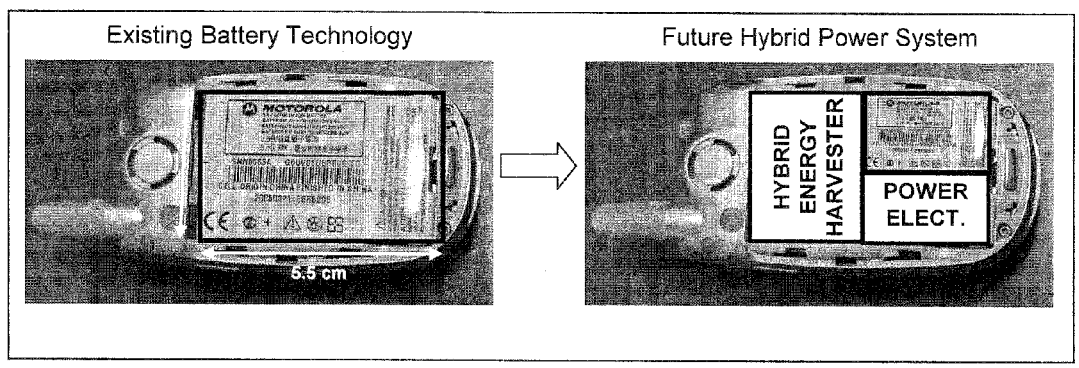
FIG. 5 shows a block diagram of a hybrid energy harvesting power system within a cell phone according to an embodiment of the present invention.

Embodiments of the present invention can be used to provide a fully operational self-powered cell-phone system. In one embodiment, the subject hybrid power system can be a compact power system equivalent in size (~10 cm$^3$) and shape to current cell phone battery systems. In an embodiment, a dual-mode magnetic/piezoelectric energy-harvesting system is provided that can be sufficient to self-power a cellular telephone handset under normal human motion. FIG. 5 shows an embodiment where a cellular phone battery is replaced with a hybrid power system having (1) a vibrational energy harvester, (2) power electronics, and (3) a small battery.

In a specific embodiment, the circuitry for receiving the output of the piezoelectric patch and the coils can be actively switched in order to create an apparent output impedance that is between the output impedance of the piezoelectric patch and the output impedance of the coils.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:
1. A vibrational energy harvester, comprising:
a body;
a proof mass connected to the body via a flexible member, wherein the proof mass moves with respect to the body via bending of the flexible member when the body is moved;
a piezoelectric patch attached to the flexible member, wherein the piezoelectric patch produces a voltage when the flexible member bends;
at least one magnet; and
at least one coil, wherein the at least one magnet and at least one coil move with respect to each other when the proof mass moves with respect to the body and produce a second voltage in the at least one coil, wherein the voltage produced by the piezoelectric patch powers a circuit, wherein the circuit outputs power from the at least one coil.

2. The vibrational energy harvester according to claim 1, wherein the circuit comprises a passive rectifier.

3. The vibrational energy harvester according to claim 1, wherein the circuit comprises an active switching converter.

4. The vibrational energy harvester according to claim 1, wherein timing information is provided to the circuit by the piezoelectric patch.

5. The vibrational energy harvester according to claim 4, wherein the timing information comprises phase information.

6. The vibrational energy harvester according to claim 4, wherein the timing information comprises amplitude information.

7. The vibrational energy harvester according to claim 1, wherein the harvester has a resonant frequency of about 2 Hz.

8. The vibrational energy harvester according to claim 1, wherein the harvester has a resonant frequency of about 60 Hz.

9. The vibrational energy harvester according to claim 1, wherein the harvester has a resonant frequency in the range of 60 Hz-300 Hz.

10. The vibrational energy harvester according to claim 1, wherein the circuit comprises an active switch-mode MOSFET AC-DC converter.

11. The vibrational energy harvester according to claim 1, wherein the at least one coil outputs an AC signal, wherein the circuit converts the AC signal to a DC signal.

12. The vibrational energy harvester according to claim 1, wherein the flexible member comprises a cantilever.

13. The vibrational energy harvester according to claim 12, wherein the at least one magnet is attached to the cantilever and the at least one coil is attached to the body.

14. The vibrational energy harvester according to claim 12, wherein the at least one coil is attached to the cantilever and the at least one magnet is attached to the body.

15. The vibrational energy harvester according to claim 1, wherein the at least one magnet comprises an array of magnets.

16. The vibrational energy harvester according to claim 1, wherein the harvester harvests energy in two axes of motion.

17. The vibrational energy harvester according to claim 1, wherein the harvester harvests energy in three axes of motion.

18. The vibrational energy harvester according to claim 1, wherein the proof mass comprises a plate, wherein the at least one magnet is attached to the plate, wherein the at least one coil is attached to the body adjacent to a first face of the plate, wherein the flexible member is attached to a first end of the plate, wherein a second end of the plate is connected to the body via a second flexible member.

19. The vibrational energy harvester according to claim 18, wherein the at least one coil is also attached to the body adjacent to a second face of the plate.

20. The vibrational energy harvester according to claim 18, wherein when the body moves, the plate-moves in a direction from the first end to the second end and back with respect to the body.

21. The vibrational energy harvester according to claim 18, wherein when the body moves, the plate moves in a direction from the first face to a second face of the plate and back with respect to the body.

22. A vibrational energy harvester, comprising:
a body;
a proof mass connected to the body via a flexible member, wherein the proof mass moves with respect to the body via bending of the flexible member when the body is moved;
a piezoelectric patch attached to the flexible member, wherein the piezoelectric patch produces a voltage when the flexible member bends;
at least one magnet; and
at least one coil, wherein the at least one magnet and at least one coil move with respect to each other when the proof mass moves with respect to the body and produce a second voltage in the at least one coil,
wherein the second voltage produced by the at least one coil powers a circuit, wherein the circuit outputs power from the piezoelectric patch.

23. The vibrational energy harvester according to claim 22, wherein the harvester has a resonant frequency of about 2 Hz.

24. The vibrational energy harvester according to claim 22, wherein the harvester has a resonant frequency of about 60 Hz.

25. The vibrational energy harvester according to claim 22, wherein the harvester has a resonant frequency in the range of 60 Hz-300 Hz.

26. The vibrational energy harvester according to claim 22, wherein the flexible member comprises a cantilever.

27. The vibrational energy harvester according to claim 26, wherein the at least one magnet is attached to the cantilever and the at least one coil is attached to the body.

28. The vibrational energy harvester according to claim 26, wherein the at least one coil is attached to the cantilever and the at least one magnet is attached to the body.

29. The vibrational energy harvester according to claim 22, wherein the at least one magnet comprises an array of magnets.

30. The vibrational energy harvester according to claim 22, wherein the harvester harvests energy in two axes of motion.

31. The vibrational energy harvester according to claim 22, wherein the harvester harvests energy in three axes of motion.

32. The vibrational energy harvester according to claim 22, wherein the proof mass comprises a plate, wherein the at least one magnet is attached to the plate, wherein the at least one coil is attached to the body adjacent to a first face of the plate, wherein the flexible member is attached to a first end of the plate, wherein a second end of the plate is connected to the body via a second flexible member.

33. The vibrational energy harvester according to claim 32, wherein the at least one coil is also attached to the body adjacent to a second face of the plate.

34. The vibrational energy harvester according to claim 32, wherein when the body moves, the plate moves in a direction from the first end to the second end and back with respect to the body.

35. The vibrational energy harvester according to claim 32, wherein when the body moves, the plate moves in a direction from the first face to a second face of the plate and back with respect to the body.

* * * * *

UNITED STATES PATENT AND TRADEMARK OFFICE
CERTIFICATE OF CORRECTION

PATENT NO. : 8,354,778 B2  
APPLICATION NO. : 12/672792  
DATED : January 15, 2013  
INVENTOR(S) : David P. Arnold and Toshikazu Nishida Page 1 of 1

It is certified that error appears in the above-identified patent and that said Letters Patent is hereby corrected as shown below:

In the Specifications:

Column 5,  
Line 49, "and $C_{ab}$" should read --and $C_{eb}$--.

In the Claims:

Column 9,  
Line 55, "plate-moves" should read --plate moves--.

Signed and Sealed this  
Ninth Day of July, 2013

Teresa Stanek Rea  
*Acting Director of the United States Patent and Trademark Office*